Figure 1:
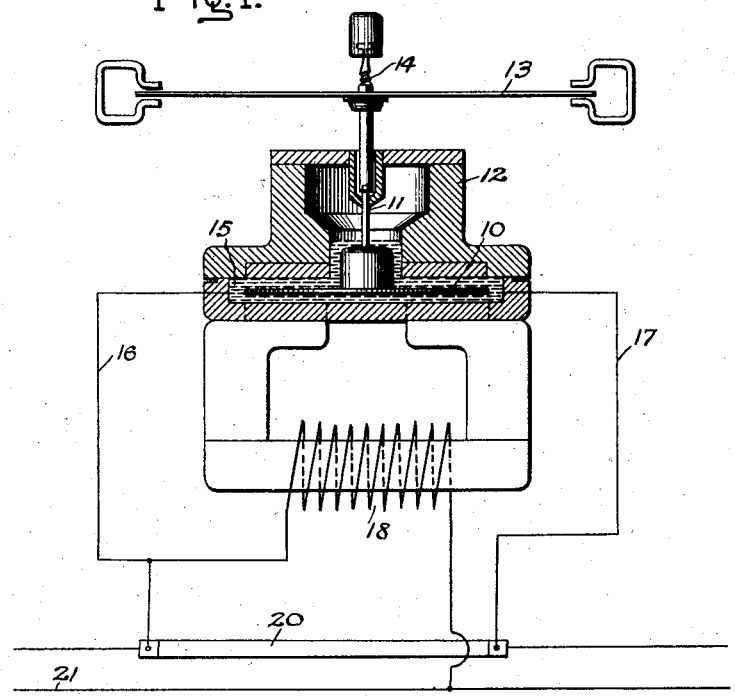

Aug. 30, 1927.

F. P. CHURCH

MERCURY METER

Filed July 3, 1923

1,640,438

Inventor:
Frederic P. Church,
by *[signature]*
His Attorney.

Patented Aug. 30, 1927.

1,640,438

UNITED STATES PATENT OFFICE.

FREDERIC P. CHURCH, OF LYNN, MASSACHUSETTS, ASSIGNOR TO GENERAL ELECTRIC COMPANY, A CORPORATION OF NEW YORK.

MERCURY METER.

Application filed July 3, 1923. Serial No. 649,385.

My invention relates to mercury meters and more in particular to the rotor of such meters and an improved process for treating the same to the end that the useful life of the rotor may be materially increased, the friction of the meter decreased and its accuracy increased.

Up until the present time the standard form of rotor for mercury meters consisted of an ordinary disc of amalgamated copper. The copper disc is generally punched from sheet copper, cleaned and then amalgamated. In the most successful prior process of treating rotors of which applicant is aware the amalgamating process is preceded by treating the rotor with mercuric nitrate, after which it is washed and immersed in a bath of mercury and the mercury agitated by air, the air having been passed through caustic soda to remove moisture and impurities. This last step, called the aging process, generally lasts for about 24 hours during which time the surface of the copper disc is amalgamated.

A rotor so treated is subject to certain inherent defects which applicant's present invention has overcome to a remarkable extent. The primary object of amalgamating the copper rotor is to fix its resistance before the meter is calibrated, since otherwise, the mercury of the meter chamber would rapidly penetrate into the copper and change its resistance and accordingly the calibration of the meter while in use. The amalgamating of the surface also reduces the friction losses. An ordinary copper punched rotor contains impurities and even though these impurities are apparently covered up by the amalgamated surface, they continue to react with the mercury of the meter chamber after the meter is in use and slowly but continually change the resistance of the rotor as more and more mercury penetrates into the copper punching which slowly dissolves the same. The impurities which are dissolved form a scum on the surface of the mercury which clings to the shaft and increases the friction losses of the meter. The surface of the rotor which was originally fairly smooth becomes more or less pitted, also increasing the friction losses. Such an instrument must be calibrated frequently and finally the rotor reaches the condition where the meter is no longer serviceable. Due to these defects the life of the rotor of a mercury meter has been recognized as a limiting factor in determining the useful life of a meter and has been a source of trouble during the life of the meter.

I have discovered that if the usual punched disc rotor is first electroplated with chemically pure copper before being amalgamated in order to completely cover up all impurities, the defects referred to are largely eliminated and the life and accuracy of the meter provided with my improved rotor is materially increased.

The features of my invention which I believe to be novel and patentable will be pointed out in the claims appended hereto. The process of treatment which I have found to be best will now be described. The type of meter to which my invention is applicable as represented in Fig. 1 and Fig. 2 shows a rotor of such a meter representing treated and untreated portions on its surface.

Figure 2:
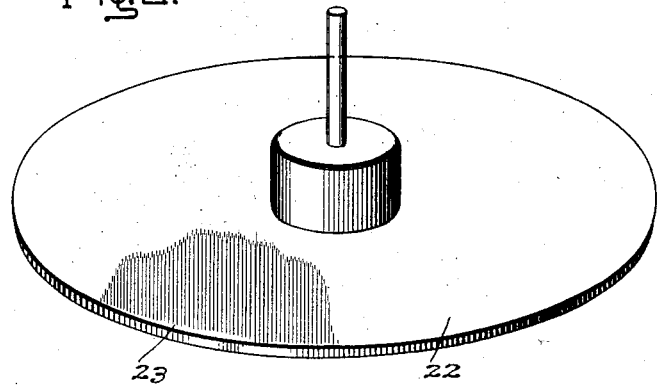

Referring to Fig. 1, 10 represents the rotor mounted on a shaft 11 which passes through the upper wall of the mercury chamber 12. The upper portion of the shaft is provided with the usual damping disc 13 and a worm 14 for communicating its motion to a registering train (not shown). The rotor 10 is completely immersed in mercury 15. Current is conveyed to and from the mercury chamber by the leads 16 and 17. The current in passing through the rotor 10 reacts against the field supplied by the magnet 18 and causes rotations in a well understood manner. The rotor circuit of the meter is shown as being connected across a line shunt 20 while the field is connected across the supply line 21.

It will be evident that the accuracy of the meter will depend upon a constant resistance of the rotor circuit and constant friction losses. As previously mentioned, exposed impurities in the rotor will continually react with the mercury and change the resistance of the rotor with respect to the shunt, necessitating frequent calibration. The rotor surface will become rough; a scum will form on the surface of the meter and cling to the shaft 11, causing a change in the friction losses and finally, the rotor reaches such a condition as to render the meter unserviceable.

These defects are largely overcome by my improved process of treating the rotor in which the usual copper punchings for the disc is first cleaned and then subjected to a slow copper-plating process, requiring about 20 minutes, and forming a very smooth, compact, chemically pure copper surface completely covering the rotor. In Fig. 2 the copper-plated surface is represented at 22 and is broken away to show the copper punching at 23. After plating, the rotor is first washed if necessary and is then treated in a mercury bath to amalgamate. There being no impurities to be removed, no aging process is necessary.

Not only is the process of my invention much shorter than the old process where aging is necessary, but tests have shown that the useful life of my improved rotor is from two to three times the life of the rotor as previously treated. This is due to the fact that there are no impurities exposed and the rotor surface is very smooth and compact so that in operation the mercury of the meter chamber penetrates into the rotor very much more slowly and evenly than with previous rotors. Because the rotor surface is perfectly smooth and remains smooth in operation and because the surface of the mercury remains free from scum the friction of the meter is considerably lower than in previous meters of the type and remains constant throughout the life of the meter; also, because of the decreased friction losses, the meter has a greater accuracy on overloads than heretofore.

While I have especially mentioned the plating of a copper punching with chemically pure copper, I do not wish to be limited to this material as I feel that my discovery may open the way to the use of other materials or combinations of materials suitable for the purpose specified. It is also evident that the entire rotor might be made of chemically pure material instead of only its surface.

What I claim as new and desire to secure by Letters Patent of the United States is:—

1. A rotor for mercury meters having a smooth compact surface of chemically pure amalgamated copper.

2. A rotor for mercury meters comprising a disc of copper containing an appreciable amount of impurity having a surface of chemically pure amalgamated copper.

3. A rotor for mercury meters comprising a disc of low resistance metal having a chemically pure amalgamated surface.

In witness whereof I have hereunto set my hand this 29th day of June, 1923.

FREDERIC P. CHURCH.

Certificate of Correction.

Patent No. 1,640,438.

Granted August 30, 1927, to

FREDERIC P. CHURCH.

It is hereby certified that error appears in the printed specification of the above-numbered patent requiring correction as follows: Page 1, line 74, for the word " as " read *is;* and that the said Letters Patent should be read with this correction therein that the same may conform to the record of the case in the Patent Office.

Signed and sealed this 11th day of October, A. D. 1927.

[SEAL.]

M. J. MOORE,
*Acting Commissioner of Patents.*